United States Patent
Shin et al.

(10) Patent No.: US 8,229,446 B2
(45) Date of Patent: Jul. 24, 2012

(54) CONTROL CHANNEL MANAGING APPARATUS, CONTROL CHANNEL SEARCHING APPARATUS, AND CONTROL CHANNEL ALLOCATION METHOD

(75) Inventors: Jae-sheung Shin, Daejeon-si (KR); Hyun-seo Park, Daejeon-si (KR); Kyung-sook Kim, Daejeon-si (KR); Yeon-seung Shin, Daejeon-si (KR); Yeong-jin Kim, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 301 days.

(21) Appl. No.: 12/536,047

(22) Filed: Aug. 5, 2009

(65) Prior Publication Data

US 2010/0159938 A1    Jun. 24, 2010

(30) Foreign Application Priority Data

Dec. 19, 2008  (KR) ........................ 10-2008-0130677

(51) Int. Cl.
*H04W 72/00*  (2009.01)
(52) U.S. Cl. ..................... 455/450; 455/452.1; 455/453; 370/329

(58) Field of Classification Search .......... 370/204–206, 370/208–210, 328, 329, 335, 203, 342, 441, 370/341; 455/450
See application file for complete search history.

(56) References Cited

U.S. PATENT DOCUMENTS 8,085,661 B2   12/2011  Harada et al.
2008/0232495 A1*  9/2008  Yu et al. ........................ 375/260

FOREIGN PATENT DOCUMENTS
KR   10-2008-0077145 A   8/2008
* cited by examiner

*Primary Examiner* — Kamran Afshar
*Assistant Examiner* — Sayed T Zewari
(74) *Attorney, Agent, or Firm* — Kile Park Goekjian Reed & McManus PLLC

(57) ABSTRACT

There are provided a control channel managing apparatus of a base station, a control channel searching apparatus of a user equipment (UE) and a control channel allocating method in a mobile communication system. When an aggregation level is high and a plurality of UEs having the same starting address of a control channel search space are scheduled in a corresponding subframe, control information with respect to conflicting UEs which have lower priorities in terms of allocation of control information can be transmitted through the conflicting UE space. Hence, more control information can be transmitted and the number of available UEs corresponding to the control information increases, and thus an improvement in the performance of the entire network can be achieved.

16 Claims, 6 Drawing Sheets

| Starting Address of Search Space $S_k^{(L)}$ | | | Number of Control Information Candidates $M^{(L)}$ |
|---|---|---|---|
| Type | Aggregation Level L | Size [in CCEs] | |
| UE Specific Space | 1 | 6 | 6 |
| | 2 | 12 | 6 |
| | 4 | 8 | 2 |
| | 8 | 16 | 2 |
| Common Space | 4 | 16 | 4 |
| | 8 | 16 | 2 |

FIG.3

Starting Address of Control Channel Search Space (L=8)

| RNTI | sf0 | sf1 | sf2 | sf3 | sf4 | sf5 | sf6 | sf7 | sf8 | sf9 |
|------|-----|-----|-----|-----|-----|-----|-----|-----|-----|-----|
| 10   | 64  | 40  | 32  | 32  | 0   | 24  | 48  | 48  | 32  | 24  |
| 11   | 8   | 16  | 16  | 56  | 32  | 40  | 0   | 48  | 0   | 32  |
| 12   | 32  | 64  | 0   | 8   | 64  | 56  | 16  | 56  | 40  | 48  |
| 13   | 48  | 40  | 48  | 32  | 24  | 0   | 40  | 56  | 8   | 56  |
| 14   | 0   | 16  | 32  | 56  | 48  | 16  | 56  | 64  | 48  | 64  |
| 15   | 24  | 64  | 16  | 16  | 8   | 32  | 0   | 0   | 16  | 0   |
| 16   | 40  | 40  | 0   | 40  | 40  | 56  | 24  | 0   | 56  | 16  |
| 17   | 64  | 16  | 48  | 64  | 64  | 0   | 40  | 8   | 24  | 24  |
| 18   | 8   | 64  | 32  | 16  | 24  | 16  | 64  | 8   | 64  | 32  |
| 19   | 32  | 40  | 16  | 40  | 56  | 32  | 8   | 16  | 32  | 40  |

FIG.4

Starting Address of Control Channel Search Space (L=4)

| RNTI | sf0 | sf1 | sf2 | sf3 | sf4 | sf5 | sf6 | sf7 | sf8 | sf9 |
|------|-----|-----|-----|-----|-----|-----|-----|-----|-----|-----|
| 10   | 52  | 40  | 24  | 72  | 28  | 28  | 24  | 20  | 52  | 64  |
| 11   | 64  | 72  | 4   | 36  | 44  | 56  | 12  | 44  | 32  | 60  |
| 12   | 52  | 28  | 60  | 0   | 60  | 8   | 24  | 44  | 12  | 32  |
| 13   | 64  | 60  | 64  | 40  | 0   | 36  | 12  | 68  | 68  | 28  |
| 14   | 52  | 16  | 44  | 4   | 40  | 64  | 24  | 68  | 48  | 24  |
| 15   | 40  | 48  | 24  | 20  | 56  | 16  | 36  | 68  | 28  | 20  |
| 16   | 52  | 4   | 4   | 60  | 72  | 20  | 24  | 16  | 8   | 68  |
| 17   | 40  | 36  | 8   | 24  | 36  | 48  | 36  | 16  | 64  | 64  |
| 18   | 52  | 68  | 64  | 64  | 52  | 0   | 4   | 40  | 44  | 60  |
| 19   | 40  | 24  | 44  | 28  | 68  | 28  | 36  | 40  | 24  | 56  |

FIG.7

Subframe 0 (No Conflicting UEs)

| RNTI | 10 | 11 | 12 | 13 | 14 | 15 | 16 | 17 | 18 | 19 |
|---|---|---|---|---|---|---|---|---|---|---|
| Starting Address of Search Space | 52 | 64 | 52 | 64 | 52 | 40 | 52 | 40 | 52 | 40 |
| Presence of Conflicting UEs | | | | | 0 | | 0 | | 0 | 0 |

FIG.8

Subframe 0 (Conflicting UEs Exist)

| RNTI | 10 | 11 | 12 | 13 | 14 | 15 | 16 | 17 | 18 | 19 |
|---|---|---|---|---|---|---|---|---|---|---|
| Starting Address of Search Space | 32 | 40 | 40 | 48 | 48 | 48 | 56 | 56 | 4 | 14 |
| Presence of Conflicting UEs | | | | | 0 | | 0 | | 0 | 0 |

↖ Allocated to Conflicting UE space

CONTROL CHANNEL MANAGING APPARATUS, CONTROL CHANNEL SEARCHING APPARATUS, AND CONTROL CHANNEL ALLOCATION METHOD

CROSS REFERENCE TO RELATED APPLICATION

This application claims the benefit under 35 U.S.C. §119 (a) of Korean Patent Application No. 10-2008-0130677, filed on Dec. 19, 2008, the disclosure of which is incorporated herein in its entirety by reference.

BACKGROUND

1. Field

The following description relates to a control channel allocation technology for transmission of control information in a physical layer between a base station and a user equipment (UE), and more particularly, to a control channel managing apparatus of a base station, a control channel searching apparatus of a UE, and a control channel allocation method in a mobile communication system.

2. Description of the Related Art

A base station in a mobile communication system such as $3^{rd}$ generation long term evolution (3G LTE) of a $3^{rd}$ generation partnership project (3GPP) transmits data to a user equipment (UE) via a physical downlink shared channel (PDSCH).

Here, a physical downlink control channel (PDCCH) is for transferring downlink control information, such as identifier of the UE, modulation method, and a coding scheme, required for the UE to process data received via the PDSCH, or for transferring uplink wireless resource information (uplink control information) allocated for data to be transmitted from the UE via the uplink channel.

A PDCCH resource is formed with control channel elements (CCEs), and the total number of CCEs of the PDCCH varies in every subframe k∈ {0, 1, 2, 3, 4, 5, 6, 7, 8, 9}, and the number is represented as $N_{CCE, k}$.

Since the entire resources of PDCCH should be monitored and decoded in every subframe without prior information, to reduce burden and improve process performance, a search space which is monitored and decoded is designated in every subframe. Each search space has a starting address determined according to a radio network temporary identifier (RNTI).

As shown in FIG. 1, the entire PDCCH is divided into a common space to which control information of data, including system information broadcasting and paging, to be received by all UEs or a plurality of UE groups in a cell is allocated and a UE specific space is allocated to which control information of data is to be transmitted to a particular UE.

The common space is always composed of 16 control channel elements (CCEs), and a base station allocates control information in a UE specific space from a starting address of the search space within a given range.

The number of CCEs required for transmitting one piece of control information is determined according to receiving quality of the PDCCH allocated to a UE, and the number of CCEs is referred to as an aggregation level.

The aggregation level can be one of 1, 2, 4, and 8. FIG. 2 is a table showing the number of CCEs required for transmitting one piece of control information according to the aggregation level, the number of CCEs forming one search space, and the number of pieces of control information allocatable to one search space.

For example, referring to FIG. 2, if the aggregation level is 1, one channel control element is required for transmitting one piece of control information and the number of CCEs forming one search space is 6, so that a total of 6 pieces of control information can be contained in one search space. Therefore, at a UE side, there are six PDCCH control information candidates, and the UE searches for corresponding control information.

If the aggregation level is 4, four CCEs are required for transmitting one piece of control information and one search space is composed of eight CCEs, so that a total of two pieces of control information can be contained in the search space.

A starting address of a search space which contains control information for a UE is allocated is determined by the equation below. Where an aggregation level L∈ {1, 2, 4, 8}, a starting address of a UE in a subframe k is represented by $S_k^{(L)}$, and this is defined as follows:

$$S_k^{(L)} = L \cdot \left\{ (Y_k + m) \bmod \left\lfloor \frac{(N_{CCE,k})}{L} \right\rfloor \right\} + i$$

Here, i=0, …, L−1, m=0, …, $M^{(L)}$, and $M^{(L)}$ is the number of PDCCH control information candidates to be monitored in a given search space. Also, $Y_k$ is defined as follows:

$$Y_k = (A \cdot Y_{k-1}) \bmod D$$

Here, A=39827, D=65537, and $Y_{k-1}$ denotes the number of RNTI of a UE. Also, the aggregation level is determined as either 4 or 8 for a common space, and $Y_k$ is 0.

The total number of CCEs of PDCCH is determined according to the number of transmitter (TX) antennas, the number of physical hybrid automatic request (HARQ) indicator channel (PHICH) groups, the number of physical resource blocks (PRBs), and a value of control format indicator (CFI).

For example, where the number of TX antennas is 4, the number of PHICH groups is 0, the number of PRB is 100 and the value of CFI is 3, the PDCCH is formed of a total of seventy seven CCEs as shown in FIG. 1, the first sixteen CCEs having an address between 0 to 15 are used as a common space, and the remaining sixty one CCEs having an address between 16 to 76 are used as a UE specific space.

FIGS. 3 and 4 are tables showing starting addresses of a search space in a UE specific space for a UE according to RNTIs obtained by the above equations. The table shown in FIG. 3 is obtained in the case where the aggregation level is 8, and the table shown in FIG. 4 is obtained in the case where the aggregation level is 4.

One of a total of 65512 starting from 10 to 65522 may be allocated to the RNTI available for the UE specific space of a UE, and FIGS. 3 and 4 show the starting addresses of the PDCCH search space of each RNTI on the assumption that there are UEs, each having an RNTI between 10 and 19 in a network.

As shown in FIGS. 3 and 4, there may be several RNTIs having the same starting address of a search space when the aggregation level is 4 or 8. In FIG. 3, when the aggregation level is 8 and a subframe is 1 (sf1), the RNTIs 10, 13, 16, and 19 have the same starting address. In FIG. 4, when the aggregation level is 4 and a subframe is 0 (sf0), the RNTIs 10, 12, 14, 16, and 18 have the same starting address.

In these cases, serious problems may occur such as, at maximum, only two RNTIs having the same starting address can be scheduled in a corresponding subframe and the remaining RNTIs cannot operate in the subframe since only two pieces of control information are allocatable to a search space when the aggregation level is 4 or 8.

As such, in the case of a high aggregation level, the more UEs there are having the same starting address in a network, the more network performance is reduced since only two pieces of control information are allocatable in the search space.

For this reason, a technology for enhancing network performance by improving the conventional control channel allocation method is required.

SUMMARY

Accordingly, in one aspect, there are provided a control channel managing apparatus of a base station, which enhances network performance by improving a method of allocating a control channel via which control information of a physical layer is transmitted between a base station and a user equipment (UE), a control channel searching apparatus in the UE and a control channel allocating method in a mobile communication system.

Consequently, when there are a plurality of UEs having the same starting address of a control channel search space and an aggregation level is high so that control information corresponding to the UEs cannot be allocated to the search space, the number of UEs which cannot operate in a corresponding subframe is reduced.

According to an aspect, there is provided a control channel managing apparatus of a base station, including: a determining unit to determine whether the number of conflicting user equipments (UEs) is greater than a threshold; a conflicting UE space managing unit to operate conflicting UE space in a control channel resource when it is determined that the number of conflicting UEs is greater than the threshold; and a reporting unit to report information in relation to the conflicting UE space operated by the conflicting UE space managing unit to all UEs in a cell.

According to another aspect, there is provided a control channel searching apparatus of a UE recalculating a starting address of a control channel search space in consideration of a conflicting UE space when information of the conflicting UE space operated by a base station is reported, searching the recalculated control channel search space for control information for the corresponding UE and receiving the found control information.

Other features will become apparent to those skilled in the art from the following detailed description, which, taken in conjunction with the attached drawings, discloses exemplary embodiments of the invention.

BRIEF DESCRIPTION OF THE DRAWINGS

FIG. 3 is a table showing starting addresses of a search space of PDCCH in a case where an aggregation level is 8.

FIG. 4 is a table showing starting addresses of a search space of PDCCH in a case where an aggregation level is 4.

FIG. 7 is a table showing starting addresses of a search space of a control channel where there is no conflicting UE space.

FIG. 8 is a table showing starting addresses of a search space of a control channel where there is a conflicting UE space.

Elements, features, and structures are denoted by the same reference numerals throughout the drawings and the detailed description, and the size and proportions of some elements may be exaggerated in the drawings for clarity and convenience.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

In the following description, a detailed description of known functions and configurations incorporated herein will be omitted when it may obscure the subject matter with unnecessary details.

Before describing the exemplary embodiments, terms used throughout this specification are defined. These terms are defined in consideration of functions according to exemplary embodiments, and can be varied according to a purpose of a user or manager, or precedent and so on. Therefore, definitions of the terms should be made on the basis of the overall context of this specification.

The term "control channel" refers to a channel, such as a physical downlink shared channel (PDSCH) in a $3^{rd}$ generation long term evolution (3G LTE) system, for transmitting control information of a physical layer between a base station and a user equipment (UE).

The term "conflicting UE" refers to a UE that cannot operate in a corresponding subframe since control information cannot be allocated to a UE with a high aggregation level and a lower priority when a plurality of UEs having the same starting address of a search space are scheduled in the corresponding subframe.

The aggregation level is determined by received signal quality and is a value specified to determine a number of control channel elements (CCEs) used for transmitting a piece of control information.

Figures 1, 2:
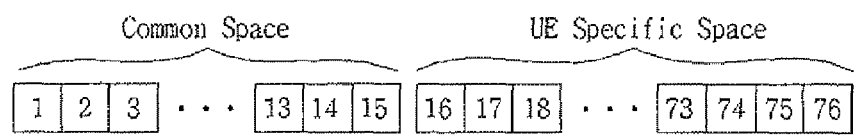
FIG. 1 is a diagram illustrating a configuration of physical downlink control channel (PDCCH) resource according to a prior art.
FIG. 2 is a table showing a PDCCH control information candidates according to an aggregation level.
Figure 5:
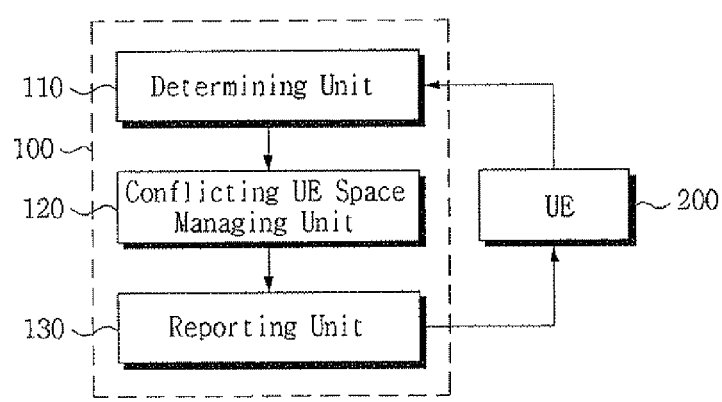
FIG. 5 is a block diagram illustrating an exemplary apparatus for managing a control channel of a base station.

FIG. 5 is a block diagram illustrating an exemplar apparatus 100 for managing a control channel of a base station. As illustrated, the apparatus 100 is implemented as a piece of hardware, a piece of software, or a combination of the two, which is mounted on the base station. The apparatus 100 includes a determining unit 110, a conflicting UE space managing unit 120, and a reporting unit 130.

The determining unit determines whether the number of conflicting UEs is greater than a threshold. The term conflicting UE refers to a UE that cannot operate in a corresponding subframe since control information cannot be allocated to a UE with a high aggregation level and a lower priority when a plurality of UEs having the same starting address of a search space are scheduled in the corresponding subframe.

The aggregation level is determined based on signal quality reported by the respective UEs. When the signal quality reported by a UE is low, a coding rate is reduced to lower the probability of decoding error occurrence of the UE, and thus the number of CCEs required for transmitting control information with respect to the UE is increased, which leads to an increase in the aggregation level.

Where the aggregation level is high, for example, 4 or 8, only two pieces of control information can be allocated to a search space. Hence, as more UEs have the same starting address of the search space, the number of conflicting UEs increases.

Since conflicting UEs cannot operate in a corresponding subframe in practice, the performance of a network deteriorates as the number of the conflicting UEs increases. Thus, transmission of control information of as many UEs as possible can enhance network performance.

To enhance the network performance, a conflicting UE space for transmitting control information of a conflicting UE is allocated in the control channel. At this time, a threshold is set to manage the conflicting UE space, and the determining unit 110 checks whether the number of conflicting UEs is greater than the threshold and determines whether or not to operate the conflicting UE space according to the result of the determination.

The threshold may be the maximum number of UEs that can transmit their control information without any conflicting UEs, but the threshold is adjustable according to circumstance.

When the number of conflicting UEs is greater than the threshold, the conflicting UE space managing unit 120 operates the conflicting UE space in the control channel resource.

In detail, the conflicting UE space managing unit 120 recalculates a starting address of a search space and allocates control information of each of conflicting UEs, which cannot allocate control information to the UE-specific space in a control channel, sequentially to the conflicting UE space.

Figure 6:
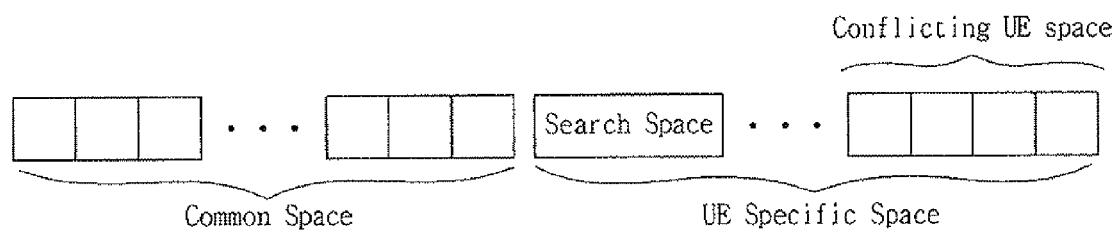
FIG. 6 is a diagram illustrating a configuration of exemplary control channel resource.

As illustrated in FIG. 6, the control channel resource includes a common space to which control information of data to be received by all UEs or a plurality of UE groups in a cell is allocated, a UE-specific space to which control information of data to be transmitted to a is particular UE is allocated, and a conflicting UE space to which control information of data to be transmitted to a conflicting UE is allocated.

The conflicting UE space may be formed independently from the common space and the UE-specific space, and may be included in the UE-specific space.

The size of the conflicting UE space depends on circumstance. In an extreme case, if there are ten UEs to be scheduled in one subframe, an aggregation level is 4 and all the UEs have the same starting address, control information corresponding to only two UEs out of the ten UEs can be transmitted, and thus there are eight conflicting UEs.

Hence, in this case, if the entire resource of the control channel except a search space allocated for the two UEs is designated for the conflicting UEs, efficiency of the control channel resource can be maximized.

The reporting unit 130 reports information of the conflicting UE space operated by the conflicting UE space managing unit 120 to all the UEs in the cell. For example, the reporting unit 130 may report the information of the conflicting UE space to all the UEs in the cell through a system information broadcasting message.

Accordingly, when a plurality of UEs having the same start address of a search space are to be scheduled in a corresponding subframe and the aggregation level is high, control information of each conflicting UE, which cannot be transmitted since the conflicting UE has a lower priority, is transmitted through the conflicting UE space allocated in the control channel resource, so that the number of control information which is transmitted through the control channel can be increased and thus performance of the entire network can be improved.

In this case, since the operated conflicting UE space of a given size should not overlap the search space of the UEs, an equation to calculate a starting address of a search space needs to be amended.

For example, on the assumption that the size of a conflicting UE space is S, the following equation is amended from a conventional equation to obtain a starting address of a search space, in order to prevent overlapping between the search space and the conflicting space.

$$S_k^{(L)} = L \cdot \left\{ (Y_k + m) \bmod \left\lfloor \frac{(N_{CCE,k} - S)}{L} \right\rfloor \right\} + i$$

For example, the size S of a conflicting UE space that can accommodate two pieces of control information of a UE of which the aggregation level is 8 or four pieces of control information of a UE of which the aggregation level is 4, is 16. Thus, where $N_{CCE,k}$ is 77, $N_{CCE,k} - S$ becomes 61.

FIG. 7 is a table showing starting addresses of a search space calculated by the conventional equation in the same subframe 0 'sf0' as illustrated in FIG. 4. In FIG. 7, it is assumed that each UE has a radio network temporary identifier (RNTI) having a number between 10 and 19 and with respect to UEs having the same start address of a search space, control information is first allocated for a UE having a lower RNTI.

Hence, there are four conflicting UEs which have the same start address of a search space and thus cannot operate in a corresponding sub-frame 0, i.e., three UEs having start address of 52, and each having RNTI 14, 16, and 18, and one UE having RNTI 19 and a start address of 40.

FIG. 8 illustrates starting addresses of the search space recalculated by the above start-address recalculation equation where the size S of a conflicting UE space is 16, which can contain four pieces of control information with an aggregation level of 4.

Referring to FIG. 8, a UE having an RNTI of 15 and a starting address of 48 does not have enough room for control information and thus the control information cannot be allocated thereto; however the control information can be allocated in the conflicting UE space. In conclusion, while in the conventional case four UEs are not operable in the subframe 0 as shown in FIG. 7, the starting address of the search space is recalculated and control information for the conflicting UE is transmitted by use of the conflicting UE space in accordance with the exemplary method as shown in FIG. 8, and thus all UEs are scheduled to operate.

Figure 9:
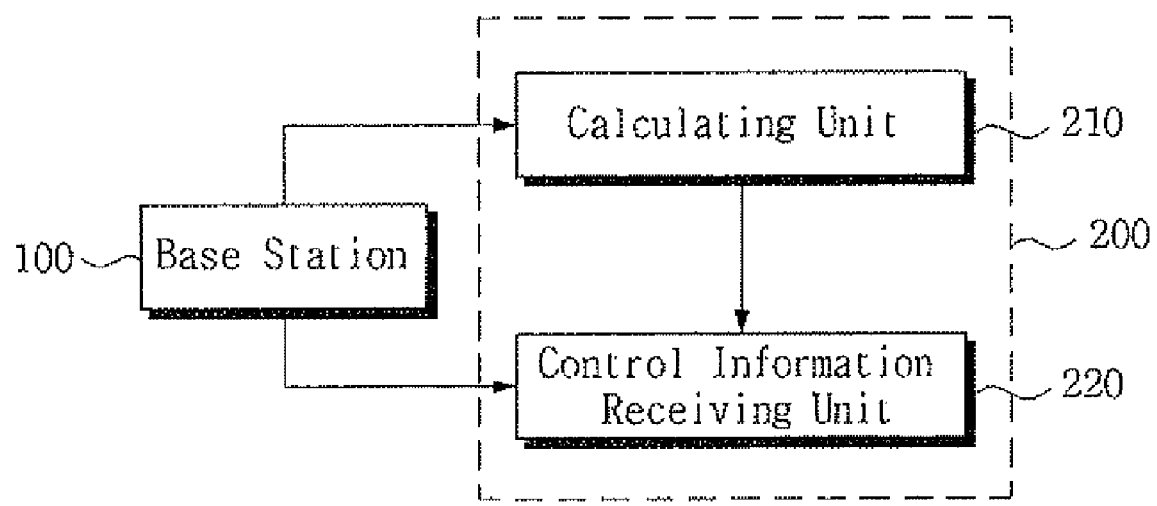
FIG. 9 is a block diagram illustrating an exemplary control channel searching apparatus of a UE.

FIG. 9 is a block diagram illustrating an exemplary control channel searching apparatus 200 in a UE. Referring to FIG. 9, the control channel search apparatus 200 is implemented in a form of hardware, software or a combination of the two, which is mounted on the UE, and includes a calculating unit 210 and a control information receiving unit 220.

The calculating unit 210 recalculates a starting address of a control channel search space in consideration of a conflicting UE space when information about the conflicting UE space managed by a base station is reported. The recalculation of the starting address of a control channel search space is described above and will not be reiterated.

The control information receiving unit 220 searches the recalculated control channel search space for control information for the corresponding UE, and receives the searched control information. At this time, the control information receiving unit 220 may additionally search the conflicting UE space for the control information for the corresponding UE.

For example, the control information receiving unit 220 may be configured to additionally search the conflicting UE space for the control information for the corresponding UE when it is predicted that an aggregation level is high since quality of a signal received from a base station has deteriorated.

At this time, the control information receiving unit 220 searches the recalculated control channel search space for control information corresponding to a RNTI of the UE.

Hence, when an aggregation level is high and a plurality of user terminals having the same starting address of a control channel search space are required to be scheduled in a subframe, the base station transmits control information of the conflicting UEs, which have lower priorities, through the conflicting UE space. In addition, the control channel searching apparatus 200 in the UE searches the control channel for control information for the corresponding UE and receives the found control information, and consequently more UEs are available in a network. Therefore, performance of the entire network can be improved.

Figure 10:
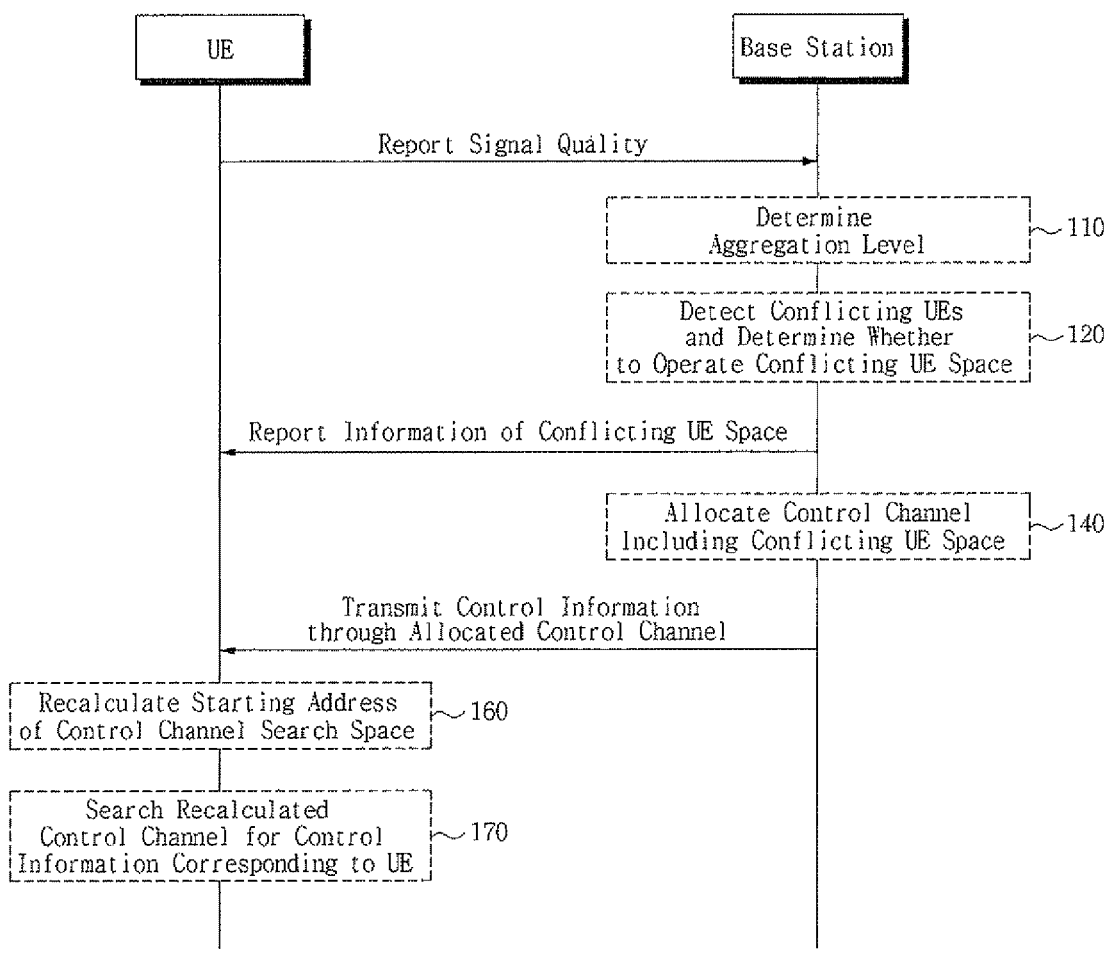
FIG. 10 is a flowchart illustrating an exemplary method of allocating a control channel in a mobile communication system.

FIG. 10 is a flowchart illustrating an exemplary method of allocating a control channel in a mobile communication system.

An aggregation level for allocating control information with respect to individual UEs is determined by a base station based on signal quality reported by each UE (operation 110).

When the signal quality reported by a UE has deteriorated, a coding rate is reduced in order to lower the probability of decoding error occurrence of the UE, and accordingly the number of control channel element (CCEs) required for transmitting control information about the corresponding UE increases. As a result, the aggregation level is increased.

Then, a base station detects at least one conflicting UE from among the UEs having the determined aggregation level (operation 120), and when it is determined that the number of conflicting UEs is greater than a threshold, the base station determines to operate a conflicting UE space on a control channel resource.

The conflicting UE is a UE which cannot operate in a corresponding subframe because the UE has the same start address of a control channel search space as other UEs with higher priorities, aggregation level is high, and consequently control information for the UE cannot be allocated to the search space of a control channel.

The correlation between the increase in the number of conflicting UEs and in the number of UEs that have the same start address of the search space in a case where the aggregation level is high is described above, and will not be reiterated.

Here, the control channel resource includes a common space to which control information of data to be received by all UEs or by a plurality of UE groups in a cell is to be allocated, a UE specific space to which control information of data to be transmitted to a particular UE is to be allocated, and a UE conflicting space to which control information of data to be transmitted to the conflicting UE is to be allocated.

The conflicting UE space may be formed separately from the common space and the UE specific space, and alternatively may be formed to be included in the UE specific space. The control channel resource is described above and will not be reiterated.

The base station reports information in relation to the determined conflicting UE space to all UEs in the cell (operation 130). At this time, the base station may use a system information broadcasting message for reporting the information on the conflicting UE space to all the UEs in the cell.

The base station allocates the control channel including the conflicting UE space to be operated (operation 140). At is time, the base station recalculates a starting address of a search space, and sequentially allocates pieces of control information with respect to conflicting UEs, which cannot be allocated to the UE specific space on the control channel resource. These processes are described above in detail and will not be reiterated.

The base station transmits the control information to each UE through the allocated control channel (operation 150). Then, the respective UEs recalculate the starting address of the control channel search space when the UEs receive the information on the conflicting UE space reported by the base station (operation 160).

Each UE searches the recalculated control channel search space for control information for the corresponding UE and receives the control information (operation 170).

Accordingly, where the aggregation level is high and a plurality of UEs that have the same starting address of control channel search space need to be scheduled in a corresponding subframe, control information with respect to conflicting UEs which have lower priorities in terms of allocation of control information can be transmitted through the conflicting UE space. Hence, more control information can be transmitted and the number of available UEs corresponding to the control information increases, and thus an improvement in the performance of the entire network can be achieved.

The above-described control channel managing apparatus, control channel searching apparatus and control channel allocating method are industrially applicable to a technique for allocating a control channel via which control information is transmitted between a base station and a UE.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A control channel managing apparatus of a base station, comprising:
 a determining unit to determine whether the number of conflicting user equipments (UEs) is greater than a threshold;
 a conflicting UE space managing unit to operate conflicting UE space in a control channel resource when it is determined that the number of conflicting UEs is greater than the threshold, to recalculate a starting address of a control channel search space and sequentially allocate control information, corresponding to each of conflicting UEs which cannot be allocated to the UE-specific space in the control channel resource, to the conflicting UE space; and
 a reporting unit to report information in relation to the conflicting UE space to all UEs in a cell.

2. A control channel managing apparatus of a base station, comprising:
- a determining unit to determine whether the number of conflicting user equipments (UEs) is greater than a threshold;
- a conflicting UE space managing unit to operate conflicting UE space in a control channel resource when it is determined that the number of conflicting UEs is greater than the threshold; and
- a reporting unit to report information in relation to the conflicting UE space to all UEs in a cell,
- wherein the conflicting UE is a UE which cannot operate in a corresponding subframe since the UE has the same recalculated starting address of the control channel search space as other UEs, an aggregation level is high and control information corresponding to the conflicting UE cannot be allocated to the control channel search space.

3. The control channel managing apparatus of claim 2, wherein the aggregation level is determined based on signal quality reported by each UE.

4. The control channel managing apparatus of claim 3, wherein the aggregation level increases with an increase in the number of control channel elements (CCEs) required for control information transmission with respect to a corresponding UE, wherein the increase in the number of CCEs is caused by reducing a code rate in order for the probability of decoding error occurrence to be lowered when the signal quality reported by the UE has deteriorated.

5. A control channel managing apparatus of a base station, comprising:
- a determining unit to determine whether the number of conflicting user equipments (UEs) is greater than a threshold;
- a conflicting UE space managing unit to operate conflicting UE space in a control channel resource when it is determined that the number of conflicting UEs is greater than the threshold; and
- a reporting unit to report information in relation to the conflicting UE space to all UEs in a cell,
- wherein the control channel resource comprises:
  - a common space to which control information to be received by all UEs or a plurality of UE groups in a cell is to be allocated,
  - a UE-specific space to which control information to be transmitted to a particular UE is to be allocated, and
  - the conflicting UE space to which control information to be transmitted to a conflicting UE is to be allocated.

6. The control channel managing apparatus of claim 5, wherein the conflicting UE space is included in the UE-specific space.

7. The control channel managing apparatus of claim 5, wherein the reporting unit reports information of the operated conflicting UE space to all the UEs in the cell through a system information broadcasting message.

8. A control channel searching apparatus of a UE, comprising:
- a calculating unit to recalculate a starting address of a control channel search space in consideration of a conflicting UE space when information of the conflicting UE space operated by a base station is reported; and
- a control information receiving unit to search the recalculated control channel search space for control information for the corresponding UE, to receive the found control information, and to additionally search the conflicting UE space for the control information for the corresponding UE when it is predicted that an aggregation level is high due to deterioration of quality of a signal received from the base station.

9. The apparatus of claim 8, wherein the control information receiving unit searches the recalculated control channel search space for control information corresponding to a radio network temporary identifier (RNTI) of the corresponding UE.

10. A method of allocating a control channel in a mobile communication system, comprising:
- determining, at a base station, an aggregation level for control information allocation with respect to each of a plurality of UEs based on signal quality reported by respective UEs;
- detecting, at the base station, at least one conflicting UE from among UEs having the determined aggregation level and determining to operate a conflicting UE space in a control channel resource when it is determined that the number of detected conflicting UEs is greater than a threshold;
- reporting, at the base station, information of the determined conflicting UE space to all user UEs in a cell;
- allocating, at the base station, a control channel including the determined conflicting UE space;
- transmitting, at the base station, control information to each of the UEs through the allocated control channel;
- recalculating, at each UE, a starting address of a control channel search space when the UE receives the information of the conflicting UE space from the base station; and
- searching, at each UE, the recalculated control channel search space for control information for the corresponding UE and receiving the found control information.

11. A method of allocating a control channel in a mobile communication system, comprising:
- determining, at a base station, an aggregation level for control information allocation with respect to each of a plurality of UEs based on signal quality reported by respective UEs;
- detecting, at the base station, at least one conflicting UE from among UEs having the determined aggregation level and determining to operate a conflicting UE space in a control channel resource when it is determined that the number of detected conflicting UEs is greater than a threshold;
- reporting, at the base station, information of the determined conflicting UE space to all user UEs in a cell; and
- allocating, at the base station, a control channel including the determined conflicting UE space, recalculating the starting address of the control channel search space, and sequentially allocating control information corresponding to conflicting UEs, which cannot be allocated to a UE-specific space in the control channel resource, to the conflicting UE space.

12. A method of allocating a control channel in a mobile communication system, comprising:
- determining, at a base station, an aggregation level for control information allocation with respect to each of a plurality of UEs based on signal quality reported by respective UEs;
- detecting, at the base station, at least one conflicting UE from among UEs having the determined aggregation level and determining to operate a conflicting UE space in a control channel resource when it is determined that the number of detected conflicting UEs is greater than a threshold;
- reporting, at the base station, information of the determined conflicting UE space to all user UEs in a cell; and allocating, at the base station, a control channel including the determined conflicting UE space, wherein the conflicting UE is a UE which cannot operate in a corresponding subframe since the UE has the same recalculated starting address as other UEs, an aggregation level is high, and control information corresponding to the conflicting UE cannot be allocated to the control channel search space.

13. A method of allocating a control channel in a mobile communication system, comprising:

determining, at a base station, an aggregation level for control information allocation with respect to each of a plurality of UEs based on signal quality reported by respective UEs;

detecting, at the base station, at least one conflicting UE from among UEs having the determined aggregation level and determining to operate a conflicting UE space in a control channel resource when it is determined that the number of detected conflicting UEs is greater than a threshold;

reporting, at the base station, information of the determined conflicting UE space to all user UEs in a cell; and allocating, at the base station, a control channel including the determined conflicting UE space, wherein the aggregation level increases with an increase in the number of control channel elements (CCEs) required for control information transmission with respect to a corresponding UE, wherein the increase in the number of CCEs is caused by reducing a code rate in order for the probability of decoding error occurrence to be lowered when the signal quality reported by the UE is deteriorated.

14. A method of allocating a control channel in a mobile communication system, comprising:

determining, at a base station, an aggregation level for control information allocation with respect to each of a plurality of UEs based on signal quality reported by respective UEs;

detecting, at the base station, at least one conflicting UE from among UEs having the determined aggregation level and determining to operate a conflicting UE space in a control channel resource when it is determined that the number of detected conflicting UEs is greater than a threshold;

reporting, at the base station, information of the determined conflicting UE space to all user UEs in a cell; and allocating, at the base station, a control channel including the determined conflicting UE space, wherein the control channel resource includes a common space to which control information of data to be received by all UEs or a plurality of UE groups in a cell is to be allocated, a UE-specific space to which control information of data to be transmitted to a particular UE is to be allocated, and the conflicting UE space to which control information of data to be transmitted to the conflicting UE is to be allocated.

15. The method of claim 14, wherein the conflicting UE space is included in the UE-specific space.

16. The method of claim 14, wherein in the reporting of the information of the conflicting UE space, the base station reports the information of the conflicting UE space to all the UEs in the cell through a system information broadcasting message.

* * * * *